United States Patent
Lee et al.

(10) Patent No.: US 12,388,090 B2
(45) Date of Patent: Aug. 12, 2025

(54) GAS DIFFUSION LAYER UNIT FOR FUEL CELL AND UNIT CELL FOR FUEL CELL INCLUDING SAME

(71) Applicants: Hyundai Motor Company, Seoul (KR); Kia Corporation, Seoul (KR)

(72) Inventors: Seon Yong Lee, Seoul (KR); Jae Man Park, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 444 days.

(21) Appl. No.: 17/873,607

(22) Filed: Jul. 26, 2022

(65) Prior Publication Data

US 2023/0178756 A1   Jun. 8, 2023

(30) Foreign Application Priority Data

Dec. 6, 2021  (KR) .................. 10-2021-0172880

(51) Int. Cl.
| | |
|---|---|
| *H01M 8/04* | (2016.01) |
| *H01M 4/88* | (2006.01) |
| *H01M 8/0273* | (2016.01) |
| *H01M 8/0286* | (2016.01) |
| *H01M 8/1004* | (2016.01) |
| *H01M 8/242* | (2016.01) |

(52) U.S. Cl.
CPC ....... *H01M 4/8807* (2013.01); *H01M 8/0273* (2013.01); *H01M 8/0286* (2013.01); *H01M 8/1004* (2013.01); *H01M 8/242* (2013.01)

(58) Field of Classification Search
CPC ............. H01M 4/8807; H01M 8/0273; H01M 8/0286; H01M 8/1004; H01M 8/242
See application file for complete search history.

(56) References Cited

U.S. PATENT DOCUMENTS

2023/0253581 A1*  8/2023  Lee .................... H01M 8/0258
                                                  429/481

FOREIGN PATENT DOCUMENTS

KR       20200029707 A       3/2020

* cited by examiner

*Primary Examiner* — Olatunji A Godo
(74) *Attorney, Agent, or Firm* — SLATER MATSIL, LLP

(57) ABSTRACT

An embodiment gas diffusion layer unit for a fuel cell includes a gas diffusion layer disposed on a surface of a membrane electrode assembly and a sub-gasket, the sub-gasket surrounding and supporting an edge of the membrane electrode assembly, and an elastic member provided in a predetermined area of an edge of the gas diffusion layer, the elastic member being integrated with the gas diffusion layer and being in contact with the sub-gasket.

20 Claims, 7 Drawing Sheets

-PRIOR ART-

GAS DIFFUSION LAYER UNIT FOR FUEL CELL AND UNIT CELL FOR FUEL CELL INCLUDING SAME

CROSS-REFERENCE TO RELATED APPLICATIONS

This application claims the benefit of Korean Patent Application No. 10-2021-0172880, filed on Dec. 6, 2021, which application is hereby incorporated herein by reference.

TECHNICAL FIELD

The present invention relates to a gas diffusion layer unit for a fuel cell and a unit cell for a fuel cell including the same.

BACKGROUND

A fuel cell is a type of power generation device that converts chemical energy of a fuel into electrical energy through an electrochemical reaction in a stack. Fuel cells can be used not only to supply electric power for industrial and household use and driving power for vehicles, but also to power small electronic products such as portable devices, and recently the area of use of fuel cells as a high efficiency clean energy source has been gradually expanded.

FIG. 1 is a view showing the configuration of a typical fuel cell stack.

As can be seen in FIG. 1, in a unit cell constituting a typical fuel cell stack, a membrane electrode assembly (MEA) is located at the innermost side, and the membrane electrode assembly 10 is composed of a polymer electrolyte membrane 11 capable of moving hydrogen cations (protons) and a catalyst layer coated on both sides of the electrolyte membrane so that hydrogen and oxygen can react, that is, a fuel electrode anode 12 and an air electrode cathode 13.

In addition, a pair of gas diffusion layers (GDLs) 20 are stacked on the outer portion of the membrane electrode assembly 10, that is, on the outer portion where the fuel electrode anode 12 and the air electrode cathode 13 are located, and a separator assembly 30 having a flow field formed therein to supply fuel and discharge water generated by the reaction is positioned outside the gas diffusion layer 20 with a gasket line 40 interposed therebetween.

Here, the separator assembly 30 is formed by bonding an anode separator 31 disposed on the anode and a cathode separator 32 disposed on the cathode while facing each other.

Meanwhile, a fuel cell stack is formed by stacking a plurality of unit cells, and an end plate 50 for supporting and fixing each of the above-described components is coupled to the outermost side of the stacked unit cells.

Here, the anode separator 31 disposed in any one unit cell is stacked so as to face the cathode separator 32 of another unit cell disposed adjacent to the formerly mentioned unit cell.

Accordingly, the separator assembly 30, in which the cathode separator 32 and the anode separator 31 of adjacent unit cells disposed to face each other are integrated, is used to construct a unit cell in order to smoothly perform the stacking process of the unit cells and maintain the alignment of the unit cells.

Also, the anode separator 31 and the cathode separator 32 constituting the separator assembly 30 are bonded and integrated, so that manifolds communicate with each other, and each reaction region is configured in a similar shape to be disposed at the same position.

Meanwhile, in the separator assembly 30, the plurality of manifolds and the reaction regions are spaces in which reactive gas or cooling water is introduced, discharged, or flows, and an airtight line is formed by the gasket line 40 along the circumference of the plurality of manifolds and the reaction regions for airtightness.

In particular, the anode separator 31 and the cathode separator 32 serve to maintain the shape of the fuel cell stack by supporting the membrane electrode assembly 10 and electrically connecting adjacent membrane electrode assemblies 10 while preventing hydrogen and air, which are reactant gases, from mixing with each other.

Therefore, the anode separator 31 and the cathode separator 32 must not only have a dense structure so that the reactant gases do not mix with each other, but also have excellent conductivity and high strength for the role of a conductor and a supporter. That is why a separator made of a metal material has been mainly used.

In addition, a land 33 and a channel 34 are formed in the reaction regions of the anode separator 31 and the cathode separator 32 to support the gas diffusion layer 20 while securing a path through which the reactant gas and cooling water flow.

Meanwhile, a frame (hereinafter, referred to as "sub-gasket") that surrounds and supports the edge of the membrane electrode assembly 10 has been used recently in order to prevent deformation of the membrane electrode assembly 10 and to facilitate handling during the manufacturing process and assembly process.

FIG. 2 is a cross-sectional view showing a unit cell constituting the typical fuel cell stack.

As shown in FIG. 2, the typical unit cell for a fuel cell is constituted by stacking a sub-gasket 14 supporting the membrane electrode assembly 10 and a pair of gas diffusion layers 20 between the anode separator 31 and the cathode separator 32.

Lately, the sizes of the gas diffusion layer 20 and the sub-gasket 14 have been reduced in order to reduce the manufacturing cost of the unit cell, and due to the reduction in the size of the gas diffusion layer 20 and the sub-gasket 14, the unit cell has a structure in which the inelastic sub-gasket 14 is directly fixed by the lands 33 formed on the anode separator 31 and the cathode separator 32.

However, the lands 33 formed on the anode separator 31 and the cathode separator 32 have tolerances attributable to the characteristics of the material and the manufacturing process. Because of the height tolerance of the anode separator 31, the lands 33 and the sub-gaskets 14 of the anode separator 31 and the cathode separator 32 do not come into close contact and the gaps G between the lands 33 and the sub-gaskets 14 are created by a predetermined distance.

As the sub-gasket 14 does not come into close contact with the anode separator 31 and the cathode separator 32 in this way, a phenomenon in which the sub-gasket is loose and moving between the anode separator 31 and the cathode separator 32 occurs. In particular, there is a problem in that the movement of the sub-gasket 14 becomes worse due to the pressure between the anode separator 31 and the cathode separator 32 during operation of the fuel cell stack, which leads to the vibration of the unit cell and the performance deviations of the fuel cell stack.

In addition, during unit cell repair, the surface pressure is lost and the performance of the fuel cell stack is deteriorated in the process of repeatedly compressing the gas diffusion layer 20 by the anode separator 31 and the cathode separator 32.

The foregoing is intended merely to aid in the understanding of the background of the present invention, and is not intended to mean that the present invention falls within the purview of the related art that is already known to those skilled in the art.

SUMMARY

The present invention relates to a gas diffusion layer unit for a fuel cell and a unit cell for a fuel cell including the same. Particular embodiments relate to a gas diffusion layer unit for a fuel cell and a unit cell for a fuel cell including the same, which can reduce the permanent deformation of the gas diffusion layer while preventing the movement of a sub-gasket.

Accordingly, embodiments of the present invention keep in mind problems occurring in the related art, and embodiments of the present invention provide a gas diffusion layer unit for a fuel cell and a unit cell for a fuel cell including the same, which can reduce the permanent deformation of the gas diffusion layer while preventing the loosening of a sub-gasket.

The features of embodiments of the present invention are not limited to the above-mentioned features, and other features not mentioned herein will be clearly understood by those skilled in the art from the description of embodiments of the present invention.

According to an embodiment of the present invention, there is provided a gas diffusion layer unit for a fuel cell, which is used in a unit cell of a fuel cell to which a sub-gasket that surrounds and supports an edge of the membrane electrode assembly is applied, the gas diffusion layer unit including a gas diffusion layer disposed on a surface of the membrane electrode assembly and the sub-gasket, and an elastic member provided in at least a predetermined area of the edge of the gas diffusion layer, integrated with the gas diffusion layer, and in close contact with the sub-gasket.

The elastic member may include a first elastic member provided on the edge of a first side of both sides of the gas diffusion layer contacting the membrane electrode assembly and the sub-gasket, and in close contact with the sub-gasket.

The elastic member may further include a second elastic member provided on the edge of a second side of both sides of the gas diffusion layer, and in close contact with a separator constituting the unit cell.

The second elastic member may be provided at a point corresponding to an unreacted region formed in an outermost area on both sides of a width direction of the separator.

The elastic member may be formed of a non-conductive elastic material.

The elastic member may be divided into an upper elastic member region disposed at a relatively upper portion and a lower elastic member region disposed at a relatively lower portion based on a direction of gravity, wherein the upper elastic member region is formed of a hydrophilic treated elastic material, and the lower elastic member region is formed of a hydrophobic elastic material.

The elastic member may be divided into an upstream elastic member region disposed at a relatively upstream point and a downstream elastic member region disposed at a relatively downstream point based on a direction in which generated water flows, wherein the upstream elastic member region is formed of a hydrophilic treated elastic material, and the downstream elastic member region is formed of a hydrophobic elastic material.

A unit cell of a fuel cell according to an embodiment of the present disclosure includes a membrane electrode assembly, a sub-gasket surrounding and supporting an edge of the membrane electrode assembly, a pair of gas diffusion layers disposed on both sides of the membrane electrode assembly and the sub-gasket, a pair of separators disposed outside the gas diffusion layers, and an elastic member provided in at least a predetermined area of the edge of the gas diffusion layer, integrated with the gas diffusion layer, and in close contact with the sub-gasket.

The elastic member may include a first elastic member provided on the edge of a first side of both sides of the gas diffusion layer contacting the membrane electrode assembly and the sub-gasket, and in close contact with the sub-gasket.

The elastic member may further include a second elastic member provided on the edge of a second side of both sides of the gas diffusion layer, and in close contact with a separator.

An unreacted region in which reactant gas does not react may be formed at an upper end and a lower end of the separator based on a direction of gravity, and the second elastic member is provided at a point corresponding to the unreacted region formed on the separator.

The elastic member may be formed of a non-conductive elastic material.

The elastic member may be divided into an upper elastic member region disposed at a relatively upper portion and a lower elastic member region disposed at a relatively lower portion based on a direction of gravity, wherein the upper elastic member region is formed of a hydrophilic treated elastic material, and the lower elastic member region is formed of a hydrophobic elastic material.

The elastic member may be divided into an upstream elastic member region disposed at a relatively upstream point and a downstream elastic member region disposed at a relatively downstream point based on a direction in which generated water flows, wherein the upstream elastic member region is formed of a hydrophilic treated elastic material, and the downstream elastic member region is formed of a hydrophobic elastic material.

The elastic member may be divided into an upstream elastic member region disposed at a relatively upstream point and a downstream elastic member region disposed at a relatively downstream point based on a direction in which air among reactant gases flows, wherein the upstream elastic member region is formed of a hydrophilic treated elastic material, and the downstream elastic member region is formed of a hydrophobic elastic material.

According to embodiments of the present invention, the following effects can be expected.

First, it is possible to reduce the movement of the sub-gasket by disposing the elastic member between the gas diffusion layer and the sub-gasket with the elastic member integrally provided at the edge of the gas diffusion layer. Accordingly, it is possible to suppress the vibration of the unit cell during operation of the fuel cell stack, thereby minimizing the decline in performance of the unit cell and increasing stability of the unit cell.

Second, it is possible to reduce the permanent deformation of the gas diffusion layer, thereby minimizing the decline in performance during repair and refastening of the unit cell by disposing the elastic member between the gas diffusion layer and the sub-gasket with the elastic member integrally provided at the edge of the gas diffusion layer.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
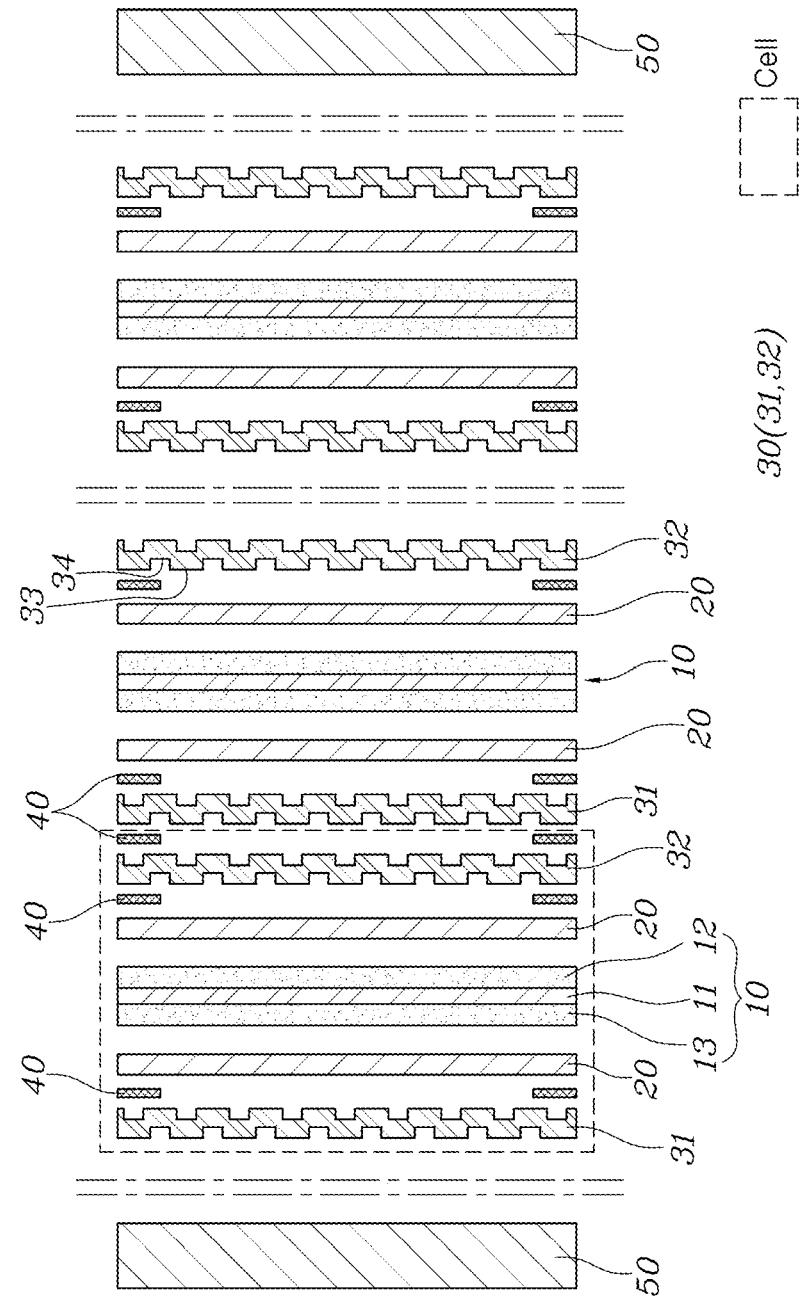
FIG. 1 is a view showing the configuration of a typical fuel cell stack.

Hereinafter, preferred embodiments of the present invention will be described in detail with reference to the accompanying drawings. However, the present invention is not limited to the embodiments disclosed below, but will be implemented in various different forms, and these embodiments are provided so that the disclosure of the present invention is complete, and to fully inform those of ordinary skill of the scope of the invention. In the drawings, the same reference numerals refer to the same elements.

Figure 2:
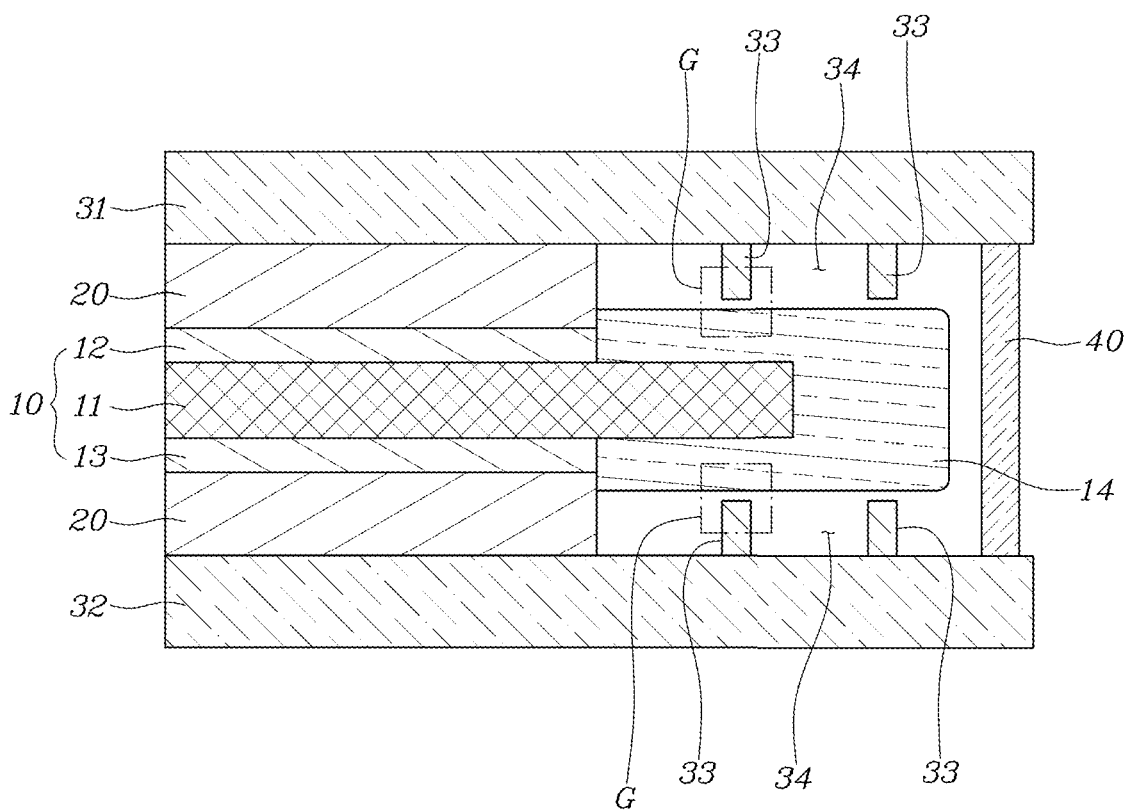
FIG. 2 is a cross-sectional view showing a unit cell constituting the typical fuel cell stack.

A unit cell for a fuel cell according to an embodiment of the present invention is configured to reduce the permanent deformation of a gas diffusion layer while preventing the movement of a sub-gasket by adding an elastic member to the gas diffusion layer, while maintaining the configuration of the unit cell constituting the typical fuel cell stack shown in FIGS. 1 and 2 as it is.

Figure 3:
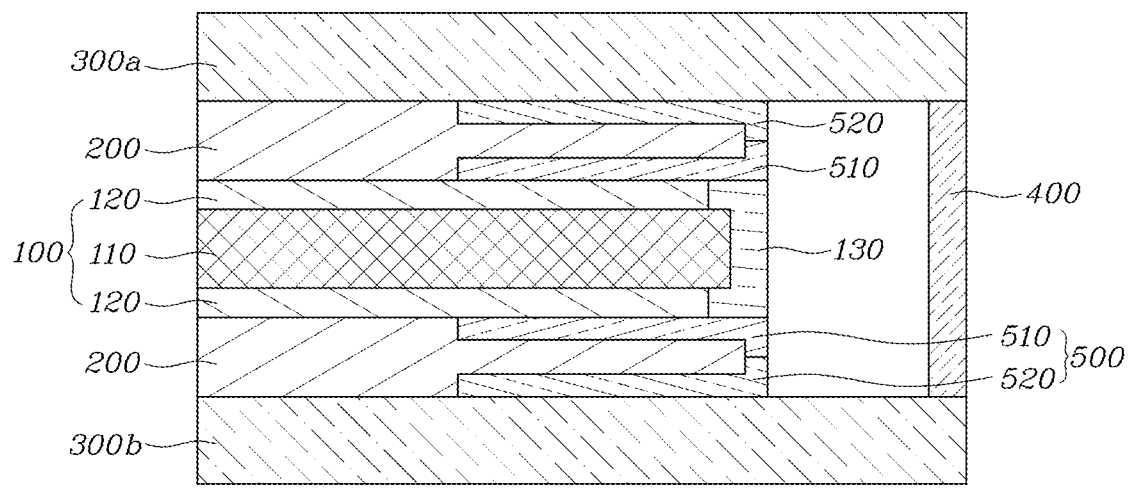
FIG. 3 is a cross-sectional view showing a unit cell for a fuel cell according to an embodiment of the present invention.
Figure 4A:
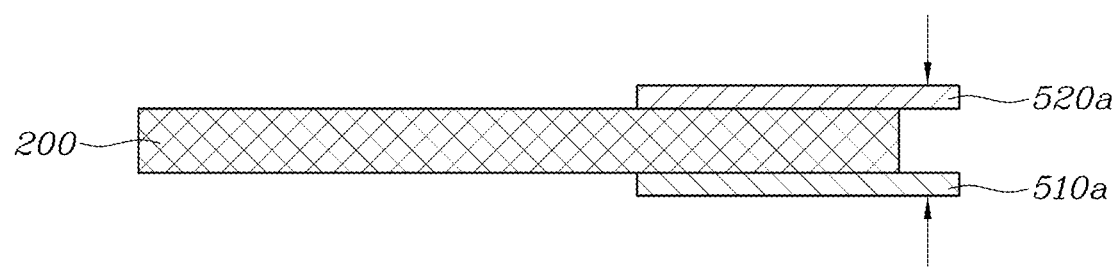
FIGS. 4A and 4B are views showing a manufacturing process of a gas diffusion layer unit for a fuel cell according to an embodiment of the present invention.
Figure 4B:
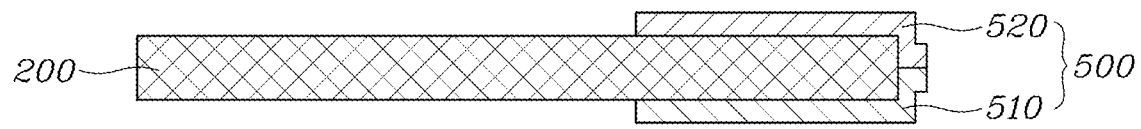
Figure 5A:
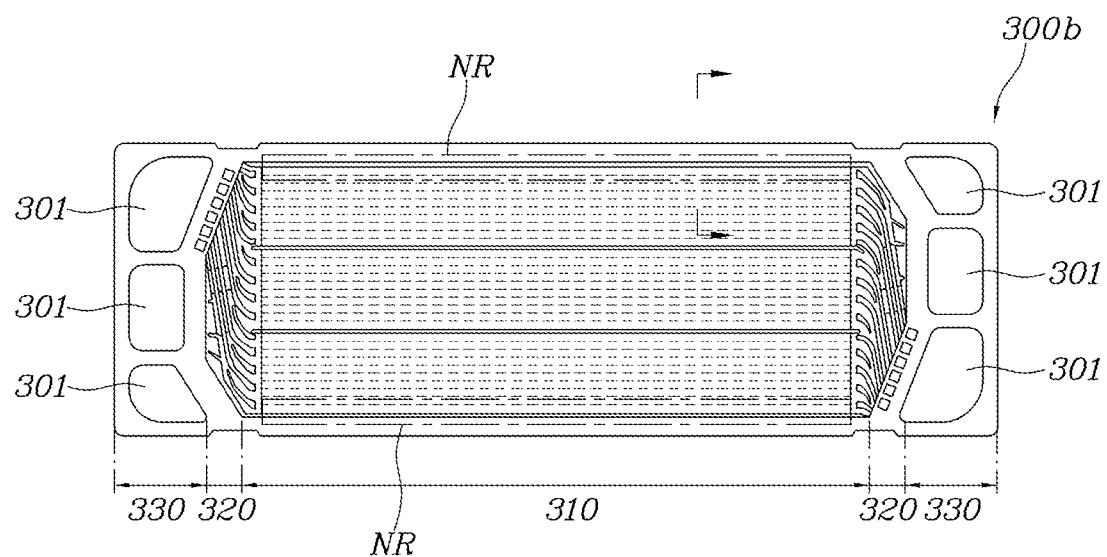
FIGS. 5A and 5B are views showing the arrangement relationship between a gas diffusion layer unit for a fuel cell and a separator according to an embodiment of the present invention.
Figure 5B:
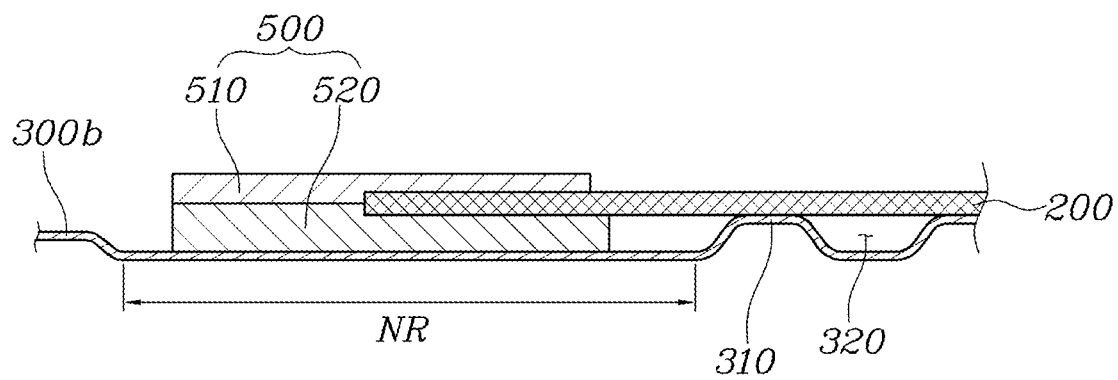
Figure 6A:
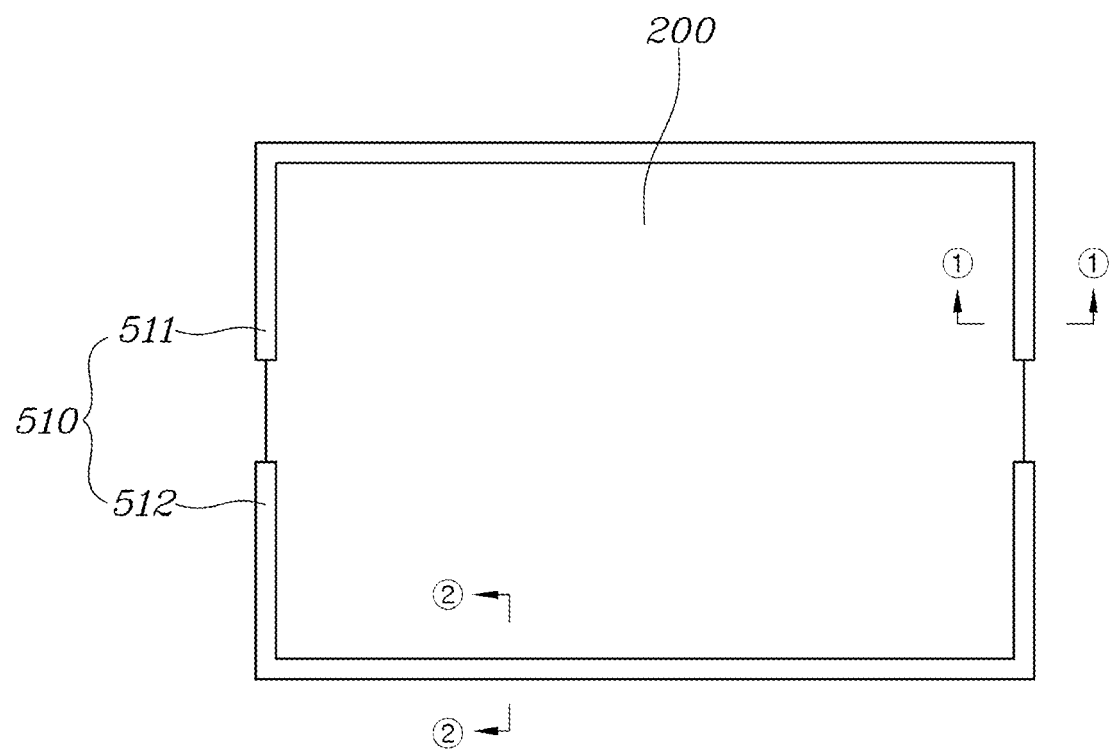
FIGS. 6A to 6D are views showing a gas diffusion layer unit for a fuel cell according to an embodiment of the present invention.
Figure 6B:
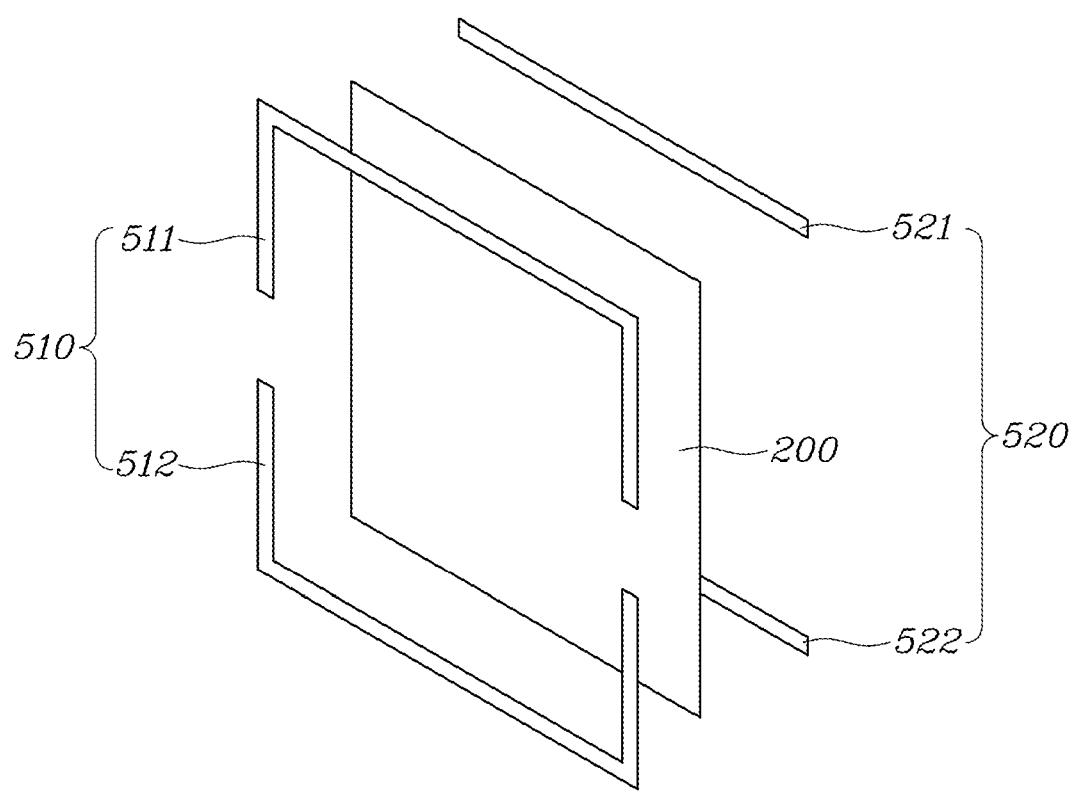
Figure 6C:
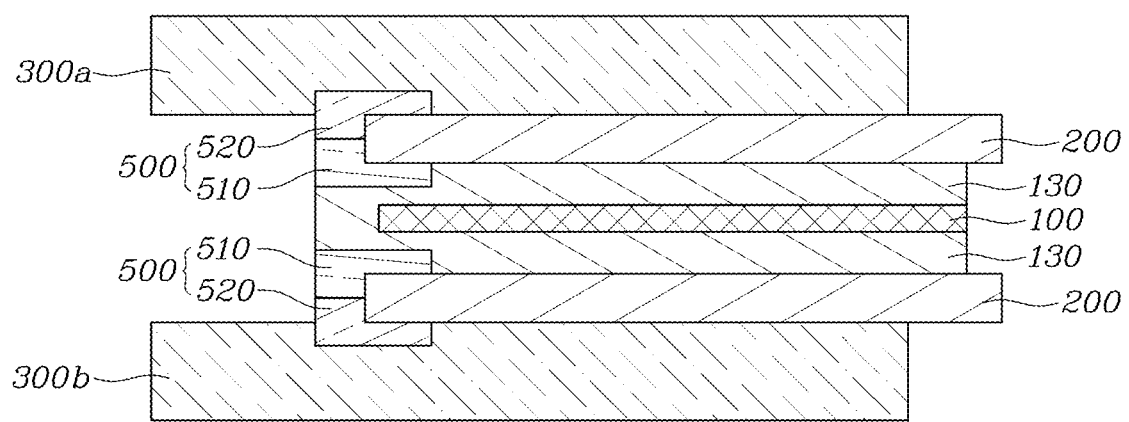
Figure 6D:
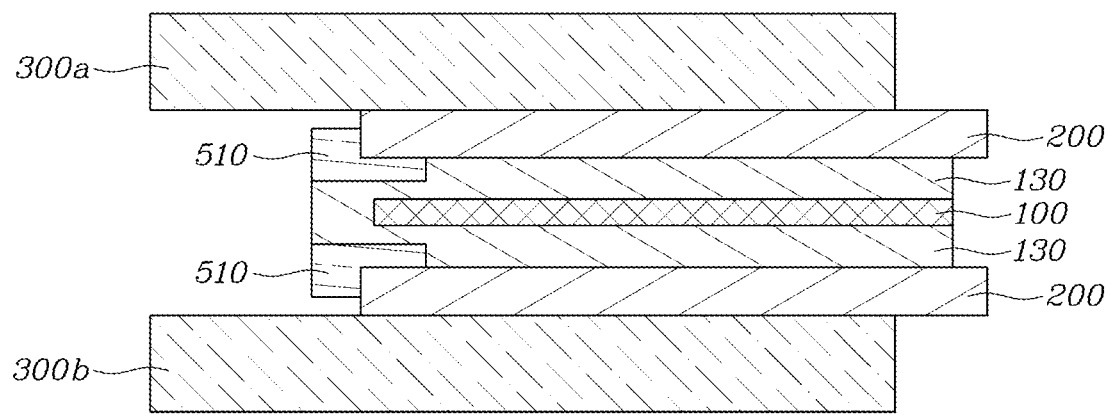
Figure 7:
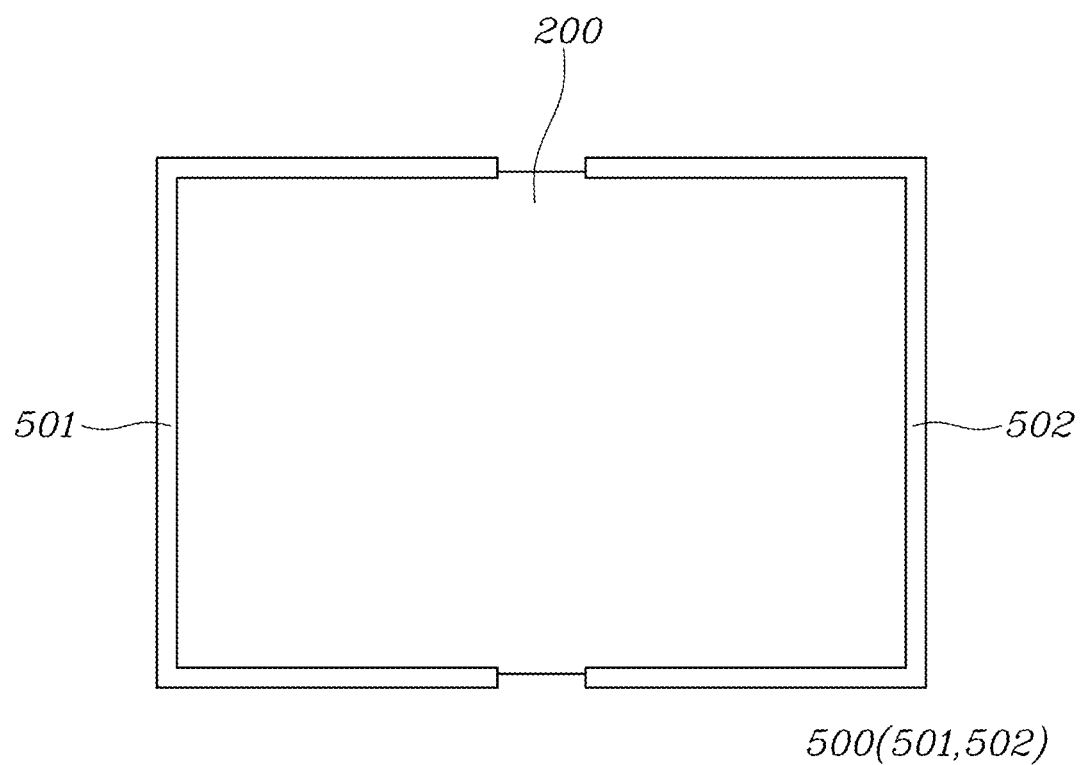
FIG. 7 is a view showing a gas diffusion layer unit for a fuel cell according to another embodiment of the present invention.

FIG. 3 is a cross-sectional view showing a unit cell for a fuel cell according to an embodiment of the present invention, FIGS. 4A and 4B are views showing a manufacturing process of a gas diffusion layer unit for a fuel cell according to an embodiment of the present invention, FIGS. 5A and 5B are views showing the arrangement relationship between a gas diffusion layer unit for a fuel cell and a separator according to an embodiment of the present invention, FIGS. 6A to 6D are views showing a gas diffusion layer unit for a fuel cell according to an embodiment of the present invention, and FIG. 7 is a view showing a gas diffusion layer unit for a fuel cell according to another embodiment of the present invention.

As shown in the drawings, the unit cell for a fuel cell according to an embodiment of the present invention includes a membrane electrode assembly 100, a sub-gasket 130 surrounding and supporting an edge of the membrane electrode assembly 100, a pair of gas diffusion layers 200 disposed on both sides of the membrane electrode assembly 100 and the sub-gasket 130, and a pair of separators 300 disposed outside the gas diffusion layers 200.

Here, the membrane electrode assembly 100 includes a polymer electrolyte membrane no and a catalyst layer 120, that is, a fuel electrode and an air electrode, coated on each side of the electrolyte membrane no so that hydrogen and air (oxygen) can react.

The sub-gasket 130 is a frame that surrounds and supports the membrane electrode assembly 100, and this frame is referred to as the sub-gasket 130.

Also, a gasket 400 for sealing is formed between the pair of separators 300a and 300b.

The unit cell for a fuel cell according to an embodiment of the present invention further includes an elastic member 500 provided in at least a predetermined area of the edge of the gas diffusion layer 200, integrated with the gas diffusion layer 200, and in close contact with the sub-gasket 130.

A plurality of unit cells configured as described above are connected in series to constitute a fuel cell stack.

Thus, the separator 300a configured in one unit cell is disposed to face the separator 300b configured in the unit cell adjacent thereto.

Therefore, in the following description, overlapping descriptions of the unit cell for the typical fuel cell stack will be omitted.

Meanwhile, the gas diffusion layer unit for a fuel cell according to an embodiment of the present invention refers to the gas diffusion layer 200 and the elastic member 500 constituting the unit cell.

Thus, the unit cell for a fuel cell according to an embodiment of the present invention is configured to include the gas diffusion layer unit.

To elaborate, the unit cell for a fuel cell according to an embodiment of the present invention includes the membrane electrode assembly 100, the sub-gasket 130 surrounding and supporting the edge of the membrane electrode assembly 100, the pair of gas diffusion layers 200 disposed on both sides of the membrane electrode assembly 100 and the sub-gasket 130, the pair of separators 300 disposed outside the gas diffusion layers 200, and the elastic member 500 provided in at least a predetermined area of the edge of the gas diffusion layer 200, integrated with the gas diffusion layer 200, and in close contact with the sub-gasket 130.

Here, the membrane electrode assembly 100, the sub-gasket 130 and the pair of separators 300 maintain the structure of the membrane electrode assembly, the sub-gasket, and the pair of separators constituting the conventional fuel cell stack shown in FIG. 2 as it is.

However, the elastic member 500 is integrated in a predetermined area at the edge of the gas diffusion layer 200.

Here, the elastic member 500 includes a first elastic member 510 provided at the edge of one side of both sides of the gas diffusion layer 200 in contact with the membrane electrode assembly 100 and the sub-gasket 130 and in close contact with the sub-gasket 130, and a second elastic member 520 provided on the edge of the other side of both sides of the gas diffusion layer 200 and in close contact with the separator 300.

The elastic member 500 is preferably formed integrally with the gas diffusion layer 200.

FIG. 4A is a view showing before the thermal compression of the first elastic member and the second elastic member, and FIG. 4B is a view showing after the thermal compression of the first elastic member and the second elastic member.

As in FIG. 4A, the first elastic member 510a and the second elastic member 520a are disposed to face each other on one side and the other side of the gas diffusion layer 200 at the edge of the gas diffusion layer 200 in order to integrate the first elastic member 510a and the second elastic member 520a in the gas diffusion layer 200.

When the first elastic member 510a and the second elastic member 520a are thermally compressed, the first elastic member 510 and the second elastic member 520 are compressed into a shape corresponding to the edge shape of the gas diffusion layer 200, and the first elastic member 510 and the second elastic member 520 are integrated and at the same time, the first elastic member 510 and the second elastic member 520 are integrated with the gas diffusion layer 200.

Of course, in the region where the elastic member 500 is formed with only the first elastic member 510, the first elastic member 510 and the gas diffusion layer 200 are integrated only by thermocompression of the first elastic member 510 and the gas diffusion layer 200.

The gas diffusion layer unit in which the gas diffusion layer 200 and the elastic member 500 are integrated in this way is disposed between the membrane electrode assembly 100 and the separator 300 supported by being surrounded by the sub-gasket 130.

The first elastic member 510 is disposed between the gas diffusion layer 200 and the sub-gasket 130 to suppress the movement such as vibration of the sub-gasket 130. Accordingly, it is preferable that the first elastic member 510 be formed in all regions at the edge where the gas diffusion layer 200 faces the sub-gasket 130. Of course, the first elastic member 510 is not limited to being formed in all regions at the edge where the gas diffusion layer 200 faces the sub-gasket 130, but may be divided and formed in predetermined areas according to the structure of the unit cell and the shape of the gas diffusion layer 200 and the sub-gasket 130.

The second elastic member 520 is disposed between the gas diffusion layer 200 and the separator 300 to prevent permanent deformation of the sub-gasket 130 by compression of the separator 300. Accordingly, it is preferable that the second elastic member 520, like the first elastic member 510, is formed in all regions at the edge where the gas diffusion layer 200 faces the separator 300. However, the second elastic member 520 is preferably formed in an unreacted region NR formed in the separator 300 as shown in FIGS. 5A and 5B for the smooth flow of reactant gas and generated water flowing between the gas diffusion layer 200 and the separator 300.

Here, the unreacted region NR refers to a region where the reactant gas does not react at the upper end and lower end of the separator 300 based on the direction of gravity.

To elaborate, lines ①-① in FIG. 6A correspond to the cross section of the region where the elastic member 500 is formed by the first elastic member 510 and the second elastic member 520, and lines ②-② in FIG. 6A correspond to the cross section of the region in which the elastic member 500 is formed with only the first elastic member 510. Thus, FIG. 6B is an exploded perspective view showing the gas diffusion layer unit, FIG. 6C is a view showing a cross section corresponding to the line ①-①, and FIG. 6D is a view showing a cross section corresponding to the line ②-②.

Meanwhile, in the embodiment, the moisture distribution for each region inside the unit cell can be uniformly maintained by dualizing the material forming the elastic member 500.

For example, the elastic member 500 may be divided into upper elastic member regions 511 and 521 disposed at a relatively upper portion and lower elastic member regions 512 and 522 disposed at a relatively lower portion based on the direction of gravity.

Here, the upper elastic member regions 511 and 521 and the lower elastic member regions 512 and 522 may be physically divided and formed using elastic materials of a different kind, or the upper elastic member regions 511 and 521 and the lower elastic member regions 512 and 522 may be physically connected but formed by injecting elastic materials of different materials into the corresponding regions. In the embodiment, the upper elastic member regions 511 and 521 and the lower elastic member regions 512 and 522 are physically separated in order to facilitate fabrication.

Here, it is preferable that the upper elastic member regions 511 and 521 are formed of a hydrophilic treated elastic material so that the generated water can stay in the region for a long time.

It is preferable that the lower elastic member regions 512 and 522 are formed of a hydrophobic elastic material so that the generated water does not stay in the region and is discharged immediately.

As such, by increasing the residence time of the generated water in the relatively dry upper region of the unit cell and decreasing the residence time of the generated water in the relatively wet lower region of the unit cell, the moisture distribution for each region inside the unit cell can be maintained uniformly.

Meanwhile, in the operation mode under which output current density of the fuel cell is high, the retention of the generated water is more affected by the flow rate and flow velocity of the reactant gas than gravity because the flow rate or flow velocity of the reactant gas is large and high.

Accordingly, the elastic member 500 may be divided into an upstream elastic member region 501 disposed at a relatively upstream point and a downstream elastic member region 502 disposed at a relatively downstream point based on the direction in which air among the reactant gases flows.

In addition, it is desirable to classify the upstream point and the downstream point based on the direction in which the generated water flows. Thus, the upstream point and the downstream point may be distinguished according to the direction in which air among the reactant gases flows.

Here, the upstream elastic member region 501 and the downstream elastic member region 502 may also be physically divided and formed using elastic materials of different materials, or the upstream elastic member region 501 and the downstream elastic member region 502 may be physically connected but formed by injecting elastic materials of different materials into the corresponding regions. In the embodiment, the upstream elastic member region 501 and the downstream elastic member region 502 are physically separated in order to facilitate fabrication.

Here, it is preferable that the upstream elastic member region 501 is formed of a hydrophilic treated elastic material so that the generated water can stay in the region for a long time.

It is preferable that the downstream elastic member region 502 is formed of a hydrophobic elastic material so that the generated water does not stay in the region and is discharged immediately.

As such, by increasing the residence time of the generated water in the relatively dry upper region of the unit cell and decreasing the residence time of the generated water in the relatively wet lower region of the unit cell, the moisture distribution for each region inside the unit cell can be maintained uniformly.

Meanwhile, the elastic member 500 is preferably formed of a non-conductive elastic material. Also, it is preferable to apply different materials for the elastic member 500, that is, the hydrophilic treated elastic material and the hydrophobic elastic material as described above.

As the hydrophobic elastic material, a non-conductive elastic material such as EPDM may be used, and as the hydrophilic treated elastic material, a hydrophobic elastic material such as EPDM may be used by coating a HMDSO polymer thin film on the surface thereof.

FIG. 7 is a view showing a gas diffusion layer unit for a fuel cell according to another embodiment of the present invention. This embodiment provides a different configuration using the elements already described.

Although the present invention has been described with reference to the accompanying drawings and the foregoing preferred embodiments, the present invention is not limited thereto but is defined by the claims set forth below. Therefore, those skilled in the art can variously change and modify the present invention without departing from the technical spirit of the present invention provided by the following claims.

What is claimed is:

1. A gas diffusion layer unit for a fuel cell, the gas diffusion layer unit comprising:
    a gas diffusion layer disposed on a surface of a membrane electrode assembly and a sub-gasket, the sub-gasket surrounding and supporting an edge of the membrane electrode assembly; and
    an elastic member provided in a predetermined area of an edge of a first side and a second side of the gas diffusion layer,
    wherein:
        the first side of the gas diffusion layer is in contact with the membrane electrode assembly and the sub-gasket, and
        the second side of the gas diffusion layer is in contact with a separator of a unit cell of the fuel cell.

2. The gas diffusion layer unit of claim 1, wherein the elastic member comprises a first elastic member provided on the edge of the first side of the gas diffusion layer in contact with the membrane electrode assembly and the sub-gasket, the first elastic member being in contact with the sub-gasket.

3. The gas diffusion layer unit of claim 2, wherein the elastic member further comprises a second elastic member provided on the edge of the second side of the gas diffusion layer, the second elastic member being in contact with the separator of the unit cell of the fuel cell.

4. The gas diffusion layer unit of claim 3, wherein the second elastic member is provided at a point corresponding to an unreacted region in which reactant gas does not react in an outermost area on both sides of a width direction of the separator.

5. The gas diffusion layer unit of claim 1, wherein the elastic member comprises a non-conductive elastic material.

6. The gas diffusion layer unit of claim 1, wherein the elastic member comprises:
    an upper elastic member region disposed at a relatively upper portion of the edge of the gas diffusion layer based on a direction of gravity, the upper elastic member region comprising a hydrophilic treated elastic material in which the elastic material is coated with hydrophilic material; and
    a lower elastic member region disposed at a relatively lower portion of the edge of the gas diffusion layer based on the direction of gravity, the lower elastic member region comprising a hydrophobic elastic material.

7. The gas diffusion layer unit of claim 1, wherein the elastic member comprises:
    an upstream elastic member region disposed at a relatively upstream point based on a direction in which generated water flows, the upstream elastic member region comprising a hydrophilic treated elastic material in which the elastic material is coated with hydrophilic material; and
    a downstream elastic member region disposed at a relatively downstream point based on the direction in which generated water flows, the downstream elastic member region comprising a hydrophobic elastic material.

8. A unit cell of a fuel cell, the unit cell comprising:
    a membrane electrode assembly;
    a sub-gasket surrounding and supporting an edge of the membrane electrode assembly;
    a pair of gas diffusion layers respectively disposed on each side of the membrane electrode assembly and the sub-gasket;
    a pair of separators respectively disposed outside the gas diffusion layers; and
    an elastic member provided in a predetermined area of an edge of a first side and a second side of the gas diffusion layer,
    wherein:
        the first side of the gas diffusion layer is in contact with the membrane electrode assembly and the sub-gasket, and
        the second side of the gas diffusion layer is in contact with a separator of the unit cell of the fuel cell.

9. The unit cell of claim 8, wherein the elastic member comprises a first elastic member provided on an edge of a first side of the one of the gas diffusion layers contacting the membrane electrode assembly and the sub-gasket, the first elastic member being in contact with the sub-gasket.

10. The unit cell of claim 8, wherein the elastic member further comprises a second elastic member provided on an edge of a second side of the one of the gas diffusion layers, the second elastic member being in contact with a corresponding one of the separators.

11. The unit cell of claim 10, wherein:
    an unreacted region in which reactant gas does not react is provided at an upper end and a lower end of the separators based on a direction of gravity; and
    the second elastic member is provided at a point corresponding to the unreacted region provided on the corresponding one of the separators.

12. The unit cell of claim 8, wherein the elastic member comprises a non-conductive elastic material.

13. The unit cell of claim 8, wherein the elastic member comprises:
    an upper elastic member region disposed at a relatively upper portion of the edge of the one of the gas diffusion layers based on a direction of gravity, the upper elastic member region comprising a hydrophilic treated elastic material in which the elastic material is coated with hydrophilic material; and
    a lower elastic member region disposed at a relatively lower portion of the edge of the one of the gas diffusion layers based on the direction of gravity, the lower elastic member region comprising a hydrophobic elastic material.

14. The unit cell of claim 8, wherein the elastic member comprises:
an upstream elastic member region disposed at a relatively upstream point based on a direction in which generated water flows, the upstream elastic member region comprising a hydrophilic treated elastic material in which the elastic material is coated with hydrophilic material; and
a downstream elastic member region disposed at a relatively downstream point based on the direction in which generated water flows, the downstream elastic member region comprising a hydrophobic elastic material.

15. The unit cell of claim 8, wherein the elastic member comprises:
an upstream elastic member region disposed at a relatively upstream point based on a direction in which air among reactant gases flows, the upstream elastic member region comprising a hydrophilic treated elastic material in which the elastic material is coated with hydrophilic material; and
a downstream elastic member region disposed at a relatively downstream point based on the direction in which air among reactant gases flows, the downstream elastic member region comprising a hydrophobic elastic material.

16. A method of forming a unit cell of a fuel cell, the method comprising:
forming a sub-gasket surrounding and supporting an edge of a membrane electrode assembly;
forming a gas diffusion layer on a side of the membrane electrode assembly and the sub-gasket;
forming a separator outside the gas diffusion layers; and
forming an elastic member provided in a predetermined area of an edge of a first side and a second side of the gas diffusion layer,
wherein:
the first side of the gas diffusion layer is in contact with the membrane electrode assembly and the sub-gasket, and
the second side of the gas diffusion layer is in contact with the separator of the unit cell of the fuel cell.

17. The method of claim 16, wherein the elastic member comprises a first elastic member provided on the edge of the first side of the gas diffusion layer contacting the membrane electrode assembly and the sub-gasket, the first elastic member being in contact with the sub-gasket.

18. The method of claim 16, wherein the elastic member further comprises a second elastic member provided on the edge of the second side of the gas diffusion layer, the second elastic member being in contact with a corresponding one of the separators.

19. The method of claim 16, wherein the elastic member comprises a non-conductive elastic material.

20. The method of claim 16, wherein the elastic member comprises:
an upper elastic member region disposed at a relatively upper portion of the edge of the gas diffusion layer based on a direction of gravity, the upper elastic member region comprising a hydrophilic treated elastic material in which the elastic material is coated with hydrophilic material; and
a lower elastic member region disposed at a relatively lower portion of the edge of the gas diffusion layer based on the direction of gravity, the lower elastic member region comprising a hydrophobic elastic material.

* * * * *